(12) United States Patent
Schmid et al.

(10) Patent No.: US 6,429,774 B1
(45) Date of Patent: Aug. 6, 2002

(54) EVALUATING UNIT FOR A DEVICE FOR DETECTING OBJECTS, IN PARTICULAR FOR MONITORING THE INTERIOR OF A MOTOR VEHICLE, AS WELL AS A DEVICE FOR DETECTING OBJECTS HAVING SUCH AN EVALUATING UNIT AND A METHOD FOR CONTROLLING SUCH A DEVICE

(75) Inventors: Reinhard Schmid, Moosbach; Marten Swart, Obertraubling; Reinhard Hamperl, Köfering; Arnulf Pietsch, Regensburg, all of (DE); Hendrik Bözen, Nijmegen (NL)

(73) Assignees: Siemens Aktiengesellschaft, Munich (DE); Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/456,714

(22) Filed: Dec. 9, 1999

Related U.S. Application Data

(63) Continuation of application No. PCT/DE98/01570, filed on Jun. 9, 1998.

(30) Foreign Application Priority Data

Jun. 9, 1997 (DE) .......................................... 197 24 216

(51) Int. Cl.⁷ .............................................. G08B 29/00

(52) U.S. Cl. ........................ 340/506; 340/426; 340/514; 340/545.3; 340/552; 340/554; 340/567

(58) Field of Search ................................. 340/426, 438, 340/506, 511, 514, 545.3, 552, 554, 567, 825.58

(56) References Cited

U.S. PATENT DOCUMENTS

| 5,521,583 A | 5/1996 | Frahm et al. |
|---|---|---|
| 5,618,056 A | 4/1997 | Schoos et al. |
| 5,682,134 A | * 10/1997 | Stallbohm .................... 340/426 |
| 5,829,782 A | * 11/1998 | Breed et al. ................. 280/735 |

FOREIGN PATENT DOCUMENTS

| DE | 3001780 A1 | 7/1981 |
|---|---|---|
| DE | 3627241 A1 | 2/1988 |
| EP | 0650869 A1 | 5/1995 |
| EP | 0708002 A1 | 4/1996 |

* cited by examiner

Primary Examiner—Daryl Pope
(74) Attorney, Agent, or Firm—Herbert L. Lerner; Laurence A. Greenberg; Werner H. Stemer

(57) ABSTRACT

A demodulator of an evaluating unit for a device for detecting objects derives a useful signal from a supplied input signal with the aid of a carrier signal. The demodulator further derives a test signal with the aid of a modulated carrier signal. An evaluator detects as a function of the useful signal whether an object is being detected and, as a function of the test signal the functionality of the device.

15 Claims, 2 Drawing Sheets ated the United States.
EVALUATING UNIT FOR A DEVICE FOR DETECTING OBJECTS, IN PARTICULAR FOR MONITORING THE INTERIOR OF A MOTOR VEHICLE, AS WELL AS A DEVICE FOR DETECTING OBJECTS HAVING SUCH AN EVALUATING UNIT AND A METHOD FOR CONTROLLING SUCH A DEVICE

CROSS-REFERENCE TO RELATED APPLICATION

This is a continuation of copending International Application PCT/DE98/01570, filed Jun. 9, 1998, which designated the United States.

BACKGROUND OF THE INVENTION

FIELD OF THE INVENTION

The invention relates to an evaluating unit for a device for detecting objects, in particular for monitoring the interior of a motor vehicle. The invention also relates to a device for detecting objects, in particular for monitoring the interior of a motor vehicle, having an evaluating unit. The invention further relates to a method for controlling a device for detecting objects, in particular for monitoring the interior of a motor vehicle.

In exceptional situations, occupant protection devices such as airbags can not only protect occupants of a vehicle against the health consequences of collision, but can also constitute a risk for the occupants. For example, if an occupant assumes in his vehicle seat a position which is unusually close to the dashboard, and a collision occurs, the head, in particular, of the occupant is struck with the full force of the airbag owing to the sudden inflation of the latter. In these circumstances, the risk of injury by the airbag is greater than its protective effect. A small child in a child seat is also exposed to just this risk of injury, in particular when the child seat is disposed on the passenger seat with its back rest facing the dashboard (reboard child seat). Thus, if an occupant or a child seat has too small a spacing from an exit opening of the airbag, the airbag is not to be activated, or is to be activated only to a reduced extent.

On the other hand, it is advantageous to be able to distinguish an occupied vehicle seat from a non-occupied one, in order to prevent the triggering of the occupant protective device assigned to the vehicle seat. Unnecessary repair costs for exchanging an airbag unit as a consequence of the unnecessary triggering can be avoided by an appropriate device for detecting objects, in particular for detecting an occupant or a child seat.

A known device for detecting a child seat in a motor vehicle (see Published, European Patent Application EP 0 708 002 A1) has a transmitting antenna and two receiving antennas which are fitted in the vehicle seat. An evaluating unit excites the transmitting antenna with a carrier signal to emit an electromagnetic field. A child seat disposed on the vehicle seat has two resonators/transponders, which characteristically vary the electromagnetic field generated by the transmitting antenna. The receiving antennas, magnetically coupled to the transmitting antenna, receive the measuring field characteristically varied by the resonators in the child seat, and supply the carrier signal modulated in this way to the evaluating unit as an input signal. The evaluating unit includes a demodulator that demodulates the input signal. By evaluating the useful signal thus obtained, an evaluator detects whether a child seat is disposed in the surroundings of the vehicle seat or not.

In the event of nondetection of a child seat, the demodulator preferably supplies a useful signal without characteristic properties, in particular a zero signal, since the carrier signal emitted by the transmitting antenna is coupled on to the receiving antenna without being modulated. The demodulation of this unmodulated carrier signal normally supplies a zero signal. However, if, for example, the transmitting antenna or the receiving antenna, the demodulator itself or a component disposed between the receiving antenna and demodulator is defective, the demodulator likewise supplies a zero signal which is interpreted by the evaluator as a child seat which is not present.

SUMMARY OF THE INVENTION

It is accordingly an object of the invention to provide an evaluating unit for a device for detecting objects, in particular for monitoring the interior of a motor vehicle, as well as a device for detecting objects having such an evaluating unit and a method for controlling such a device which overcome the above-mentioned disadvantages of the prior art devices and methods of this general type, which device/method is capable of reliably distinguishing a defect from an object which is not detected.

With the foregoing and other objects in view there is provided, in accordance with the invention, an evaluating unit for a device for detecting objects, including:

a demodulator receiving an input signal and a carrier signal and deriving a useful signal from the input signal with the aid of the carrier signal, the demodulator generating a modulated carrier signal modulated with an auxiliary signal and deriving a test signal from the input signal with the aid of the modulated carrier signal; and an evaluator receiving the useful signal and the test signal, the evaluator detects a presence of an object by evaluating the useful signal and detects a malfunction by evaluating the test signal.

In addition to deriving the useful signal from the input signal, supplied to the evaluating unit, with the aid of the carrier signal, the demodulator is also configured to the effect that the input signal can be demodulated with the aid of the carrier signal, modulated with an auxiliary signal, in order to derive a test signal. The evaluator downstream of the demodulator evaluates the useful signal and/or the test signal. The evaluator detects the presence of the object by evaluating the useful signal. The evaluator also detects a malfunction by evaluating the test signal.

In an alternative embodiment, a receiving antenna is provided which supplies the input signal to the previously described evaluating unit according to the invention.

In a method for operating the device, the carrier signal is emitted via a transmitting antenna of the device. The carrier signal is modulated with an object-specific signal by the object to be detected. The modulated carrier signal is received as the input signal by a receiving antenna coupled to the transmitting antenna. The input signal is demodulated with the carrier signal, the object being detected when the input signal demodulated with the carrier signal includes the object-specific signal. The input signal is demodulated with the carrier signal modulated with an auxiliary signal when the input signal demodulated with the carrier signal does not include the object-specific signal. A malfunction is detected when the input signal demodulated with the modulated carrier signal does not include the auxiliary signal.

The advantage of the invention resides in that an object not detected can be distinguished from a defect in the evaluating unit or the device, if the defect relates to one of the components of the device upstream of the evaluator, that is to say the antennas or the demodulation circuit, in particular. If the result of the evaluation of the useful signal is that it does not include any signal shape characteristic of an object, that is to say any object-specific signal, in a further step the input signal of the evaluating unit is demodulated with the carrier signal which is, however, now for its part modulated. If the auxiliary signal with which the carrier signal was modulated is detected by the evaluator in the test signal formed in such a way, the system is not defective. At the same time, no object is detected. In this case, the input signal corresponds to the carrier signal which is subsequently demodulated with the aid of the modulated carrier signal, with the result that the modulating signal, precisely the auxiliary signal, is detected in the test signal. However, if the auxiliary signal is not detected in the test signal, a defect is present in the device. For example, the receiving antenna is broken, with the result that the input signal is equal to a zero signal.

Depending on the evaluation of the test signal, the evaluator emits output signals which can be distinguished from one another. The invention also permits a device defect to be checked without a large outlay on circuitry. Thus, there is no need for current or voltage measuring devices. A defect can be detected solely by controlling the demodulator and by the evaluation, possibly in terms of software, of its output signal.

Other features which are considered as characteristic for the invention are set forth in the appended claims.

Although the invention is illustrated and described herein as embodied in an evaluating unit for a device for detecting objects, in particular for monitoring the interior of a motor vehicle, as well as a device for detecting objects having such an evaluating unit and a method for controlling such a device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
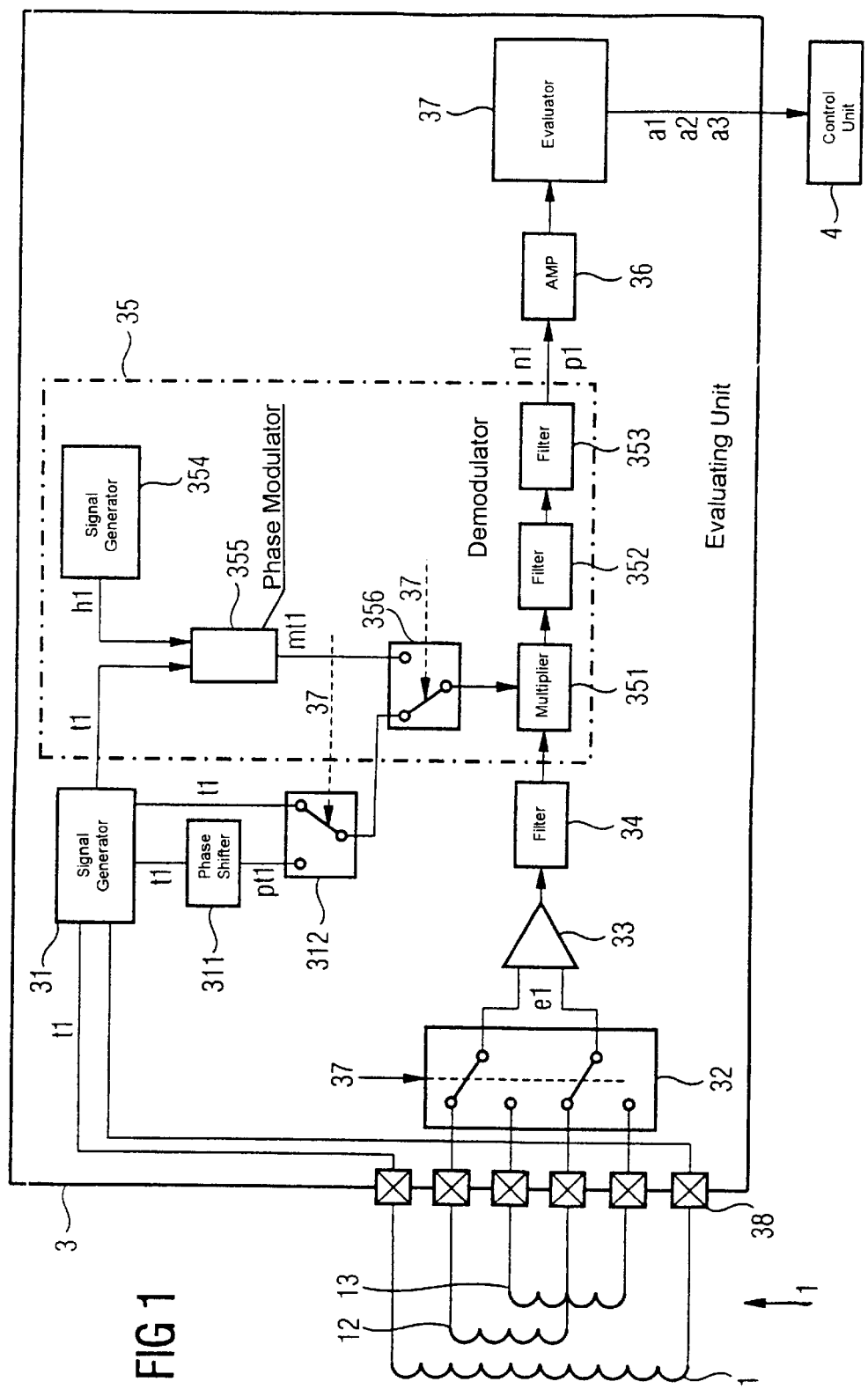
FIG. 1 is a diagrammatic, block diagram of a device with an evaluating unit according to the invention.

In all the figures of the drawing, sub-features and integral parts that correspond to one another bear the same reference symbol in each case. Referring now to the figures of the drawing in detail and first, particularly, to FIG. 1 thereof, there is shown an invention that is explained below with the aid of a device for detecting child seats in a motor vehicle. However, it goes without saying that the invention can also be brought to bear with any other device for detecting objects. The invention is preferably used with devices for detecting objects in an interior of a motor vehicle, in particular the device detects child seats or occupants in the interior of the motor vehicle. The invention is used advantageously wherever an object to be detected varies a measuring field/transmitted signal in a characteristic way. The measuring field can be output in this case in a pulsed fashion or continuously during the operation of the device or in the case of initialization.

FIG. 1 shows a device according to the invention for detecting a child seat placed on a vehicle seat. The device includes an antenna device 1 with a transmitting antenna 11, a first receiving antenna 12 and a second receiving antenna 13. The antennas 11, 12 and 13 are connected to terminals 38 of an evaluating unit 3. In this case, the receiving antennas 12 and 13 are electrically connected to a multiplexer 32 of the evaluating unit 3. An amplifier 33 and a low-pass filter 34 are connected downstream of the multiplexer 32. The low-pass filter 34 is electrically connected to a demodulator 35 downstream of which a further amplifier 36 and an evaluator 37 are connected. The evaluator 37 is electrically connected to an airbag control unit 4.

The demodulator 35 includes a multiplier 351, a low-pass filter 352 and a high-pass filter 353. The multiplier 351 is connected, on the one hand, to the low-pass filter 34 and, on the other hand, to a changeover switch 356. The demodulator 35 also includes an auxiliary signal generator 354, a phase modulator 355 and the changeover switch 356. The evaluating unit 3 also includes a carrier signal generator 31, a phase shift element 311 and a changeover switch 312.

The carrier signal generator 31 applies a carrier signal t1 to the transmitting antenna 11. A measuring field output as a result by the transmitting antenna 11 is modulated in phase by an object to be detected, preferably with an object-specific signal. The first receiving antenna 12 supplies the carrier signal t1, modulated by the detected object, as an input signal e1 to the multiplexer 32. The input signal e1 is amplified in the amplifier 33 and freed from high-frequency interference signal components in the low-pass filter 34. The cutoff frequency of the low-pass filter 34 is higher in every case than the frequency of the carrier signal t1.

The input signal e1 conditioned in such a way subsequently traverses the demodulator 35. In the multiplier 351, the input signal e1 is multiplied by a further signal, in particular by the carrier signal t1 of the carrier signal generator 31. If the carrier signal t1 is to be present at the multiplier 351, the changeover switches 312 and 356 which can be controlled by the evaluator 37 are to be set in accordance with FIG. 1.

In the device described, the measuring field output by the transmitting antenna 11 is phase-modulated, with the result that in the event of the presence of an object the input signal e1 corresponds to the phase-modulated carrier signal t1. For the purpose of demodulating the carrier signal t1 phase-modulated in such a manner, the signal is multiplied by the carrier signal t1, with the result that the phase modulation is converted into an amplitude modulation. Phase changes in the input signal e1 are expressed in the signal at the output of the multiplier 351 in a low-frequency signal component that thereby carries the information. In order to obtain the low-frequency signal component of the signal at the output of the multiplier 351 as a useful signal n1, the high-frequency carrier components of the signal are filtered out by the low-pass filter 352, whose cutoff frequency is situated below the frequency of the carrier signal t1. Because of the phase shifts, which cannot be influenced, between the input signal e1 and carrier signal t1, the signal at the output of the low-pass filter 352 has a direct component. The latter is removed by the high-pass filter 353, with the result that at the output of the high-pass filter 353 the useful signal n1 freed from interference, carrier oscillations and direct components is fed as output of the demodulator 35 to the further amplifier 36 and is amplified there. Thereupon, the signal n1 is evaluated in the evaluator 37. If the evaluator 37 detects in the useful signal n1 a signal shape which permits a conclusion concerning a corresponding modulation of the carrier signal t1 by an object to be detected—that is to say if, for example, in this case the useful signal has substantial changes in amplitude at a specific frequency which are caused by phase modulation of the carrier signal t1 at the same frequency by a resonator in the child seat to be detected—the evaluator 37 supplies a first output signal a1 to the airbag control unit 4. If the device renders it possible to detect not only the existence of the child seat, but also its alignment or position, instead of the first output signal a1, the evaluator 37 can, of course, supply to the airbag control unit 4 a signal of multiply differentiated construction. Usually, upon receipt of the first output signal a1 the airbag control unit 4 is caused to prevent the associated airbag from being triggered.

However, if the evaluator 37 detects that the useful signal n1 does not characterize the presence of the child seat, or does so inadequately, it controls the changeover switch 356 appropriately in order to multiply the input signal e1, supplied by the receiving antenna 12, in the multiplier 351 not by the carrier signal t1, but instead by another signal, in particular a modulated carrier signal mt1. In order to generate the modulated carrier signal mt1, the carrier signal t1 of the carrier signal generator 31 is modulated in a phase modulator 355 with an auxiliary signal h1. The modulated carrier signal mt1 is multiplied in the multiplier 351 with the input signal e1 and likewise traverses the bandpass filters 352 and 353, with the result that it is available at the output of the demodulator 35 as a test signal p1 for evaluation by the evaluator 37. If the evaluator 37 detects that the test signal p1 includes the auxiliary signal h1, it supplies the second output signal a2 as a sign that the device is operating acceptably and that no child seat has been detected. If the auxiliary signal h1 is not detected in the test signal p1, the evaluator 37 supplies the third output signal a3 with the message that the device has a defect.

In the first case, the receiving antenna 12 supplies the input signal e1 derived from the carrier signal t1 (with damped amplitude, if appropriate) which then serves subsequently for demodulation of the modulated carrier signal mt1. The modulating auxiliary signal h1 is present subsequently as the test signal p1. If, however, the transmitting antenna 11 or the receiving antenna 12, for example, is defective as a consequence of the action of mechanical force on the vehicle seat, the demodulator 35 is, for example, supplied a zero signal as the input signal e1 which, as the test signal p1, can be distinguished acceptably from the test signal p1 in the case of a nonexistent child seat but a device which is functional.

Upon detection of a second output signal a2, the airbag control unit 4 will release the airbag to be controlled in the case of a sufficiently severe impact. If the evaluating unit 3 signals a third output signal a3 to the airbag control unit, an optical or acoustic warning device is actuated, and the occupant is thereby advised of the lack of functionality of his child seat detection.

The evaluating unit 3 preferably includes a phase shift element 311 for the purpose of shifting the phase of the carrier signal t1 by a fixed absolute value. This phase shift is controlled with the aid of the changeover switch 312 by the evaluator 37. In addition to the phase, caused by the phase modulation of the resonator, in the input signal e1 derived from the carrier signal t1, a further phase is present between the input signal e1 and the carrier signal t1, which is used for demodulation and, in this case, in particular for multiplication by the input signal e1. This phase results from interference, for example from the configuration of metal objects in the surroundings of the antenna configuration 1. This nonpredictable phase can have the effect that the useful and/or test signal n1 and p1, respectively, supplied by the demodulator 35 is situated at an operating point which has an extremely low sensitivity to the changes in amplitude in the useful signal n1 or test signal p1, respectively, which contain information. It is possible by virtue of the controllable phase change in the carrier signal t1 used for demodulation to achieve for the useful and/or test signal n1 and p1, respectively, a different operating point which ensures a higher sensitivity to changes in amplitude in the signal.

Figure 2:
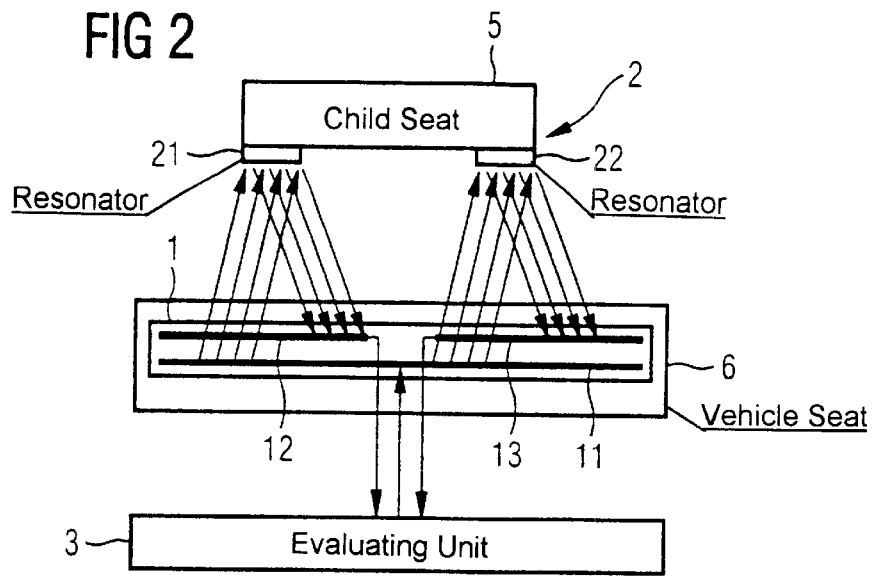
FIG. 2 is a block diagram of a spatial representation of the device for detecting a child seat placed on a vehicle seat in a motor vehicle.

FIG. 2 shows the mode of operation of the device according to the invention in accordance with FIG. 1. The antenna configuration 1 with the transmitting antenna 11 and the receiving antennas 12 and 13 is disposed in a vehicle seat 6. The spatial arrangement of the receiving antennas 12, 13 and of the transmitting antenna 11 relative to one another illustrates their magnetic coupling. The receiving antennas 12, 13 and the transmitting antenna 11 supply signals to and/or are controlled by the evaluating unit 3, which can be disposed in the vehicle seat 6 together with the antenna device 1. Shown diagrammatically above the vehicle seat 6 is a child seat 5 with resonators 2, in particular a first resonator 21, disposed on the left hand side, and a second resonator 22, disposed on the right hand side. Signals from the transmitting antenna 12—indicated by arrows—are influenced by the resonators 21, 22 in an appropriate way and received by the receiving antennas 12 and 13, respectively.

Figure 3:
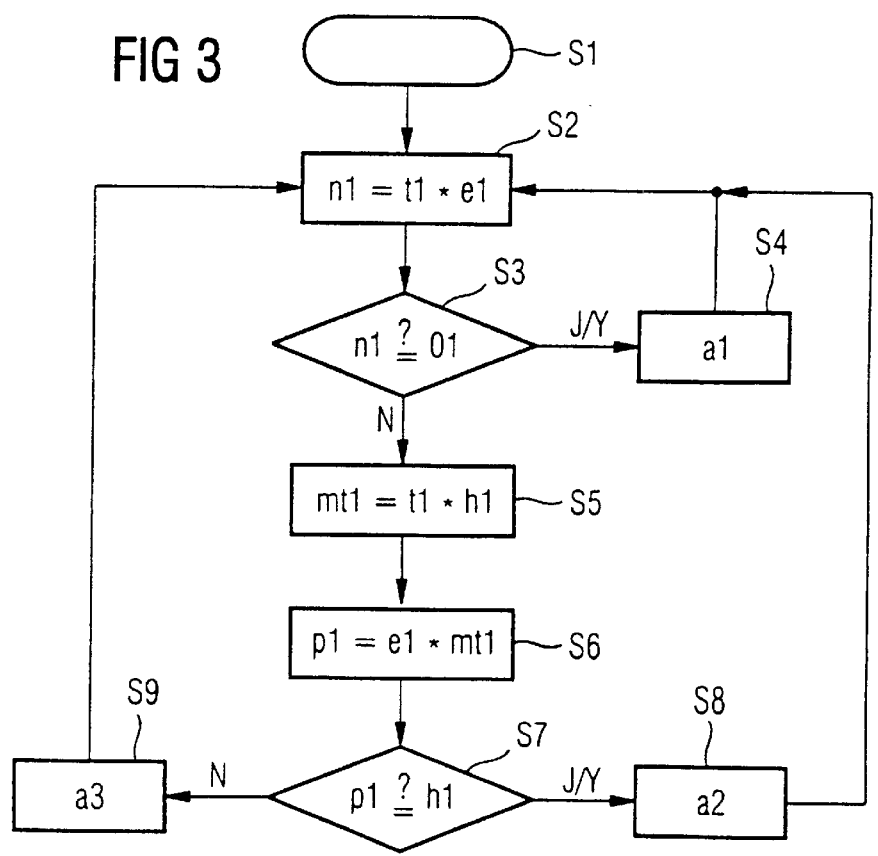
FIG. 3 is a flowchart of a method according to the invention.

FIG. 3 shows a flowchart of the method according to the invention. After initialization in step S1, the useful signal n1 present at the output of the demodulator 35 is calculated from the input signal e1, present at an input of the evaluating device 3, and the carrier signal t1 in a step S2. Thereupon, a check is made in a step S3, preferably by the evaluator 37, as to whether a signal pattern, preferably an object-specific signal 01, which permits the child seat to be inferred in the surroundings of the device is detected in the signal n1. If this is the case—J/Y—the first output signal a1 is generated by the evaluator 37 in step S4 and the useful signal n1 is generated anew—preferably after a fixed time interval has elapsed. If the useful signal n1 does not permit a child seat KS to be inferred in step S3—N—the evaluator 37 causes the modulated carrier signal mt1 to be used instead of the carrier signal t1 for the purpose of demodulating the input signal e1. In this case, the modulated carrier signal mt1 is calculated in step S5 by multiplying the carrier signal t1 by the auxiliary signal h1 for the purpose of modulation. In step S6, the test signal p1 is thereupon formed in the multiplier 351 by multiplication for the purpose of demodulation from the value of the input signal e1 and the modulated carrier signal mt1. The test signal p1 is compared with the auxiliary signal h1 in step S7. If the auxiliary signal h1 is included in the test signal p1—J/Y—the evaluator 37 then emits the second evaluation signal a2 in step S8, otherwise—N—the third output signal a3 is generated in step S9. In both cases, a further demodulation of the input signal e1 is performed with the aid of the carrier signal t1.

It goes without saying that numerous modifications are possible. For example, instead of the phase modulation described above, frequency modulation or amplitude modulation can be performed. The output signals a1 to a3 supplied by the evaluator 37 are to be understood in the sense of messages which are present in modulated signal form for transmission to the airbag control unit 4, or can be coded in some other way.

We claim:

1. An evaluating unit for a device for detecting objects, comprising:

a demodulator receiving an input signal and a carrier signal and deriving a useful signal from the input signal with the aid of the carrier signal, said demodulator generating a modulated carrier signal modulated with an auxiliary signal and deriving a test signal from the input signal with the aid of the modulated carrier signal; and an evaluator receiving the useful signal and the test signal, said evaluator detects a presence of an object by evaluating the useful signal and detects a malfunction by evaluating the test signal.

2. The evaluating unit according to claim 1, wherein said evaluator detects the object when the useful signal includes an object-specific signal.

3. The evaluating unit according to claim 1, wherein said evaluator detects the malfunction when the test signal does not include the auxiliary signal.

4. The evaluating unit according to claim 1, wherein said demodulator has a multiplier for multiplying the input signal by the carrier signal, and for multiplying the input signal by the modulated carrier signal.

5. The evaluating unit according to claim 4, wherein said demodulator includes a low-pass filter connected downstream of said multiplier.

6. The evaluating unit according to claim 1, wherein said demodulator demodulates a phase-modulated input signal.

7. The evaluating unit according to claim 1, wherein said demodulator demodulates an amplitude-modulated input signal.

8. The evaluating unit according to claim 6, wherein the carrier signal is a high-frequency carrier signal having a phase angle that can be changed by a fixed absolute value.

9. The evaluating unit according to claim 1, wherein the object to be detected is an occupant of a vehicle.

10. The evaluating unit according to claim 1, wherein the object to be detected is a child seat disposed on a vehicle seat.

11. The evaluating unit according to claim 1, wherein the object to be detected is disposed in an interior of a motor vehicle.

12. A device for detecting objects, comprising:

a receiving antenna receiving an input signal; and an evaluating unit receiving the input signal from said receiving antenna and generating a carrier signal, said evaluating unit, including:

a demodulator receiving the input signal and the carrier signal and deriving a useful signal from the input signal with the aid of the carrier signal, said demodulator generating a modulated carrier signal modulated with an auxiliary signal and deriving a test signal from the input signal with the aid of the modulated carrier signal; and an evaluator receiving the useful signal and the test signal, said evaluator detects a presence of an object by evaluating the useful signal and detects a malfunction by evaluating the test signal.

13. The device according to claim 12, including a transmitting antenna emitting an electromagnetic measuring field coupled magnetically to said receiving antenna.

14. The device according to claim 12, wherein said evaluation unit is to be disposed in an interior of a motor vehicle.

15. A method for controlling a device for detecting objects including the objects disposed in an interior of a motor vehicle, which comprises:

emitting a carrier signal via a transmitting antenna;

modulating the carrier signal with an object-specific signal from an object to be detected resulting in an modulated carrier signal received as an input signal by a receiving antenna coupled to the transmitting antenna;

demodulating the input signal with the carrier signal, and the object being derived to be detected when the input signal demodulated with the carrier signal includes the object-specific signal; and demodulating the input signal with a further modulated carrier signal modulated with an auxiliary signal if the input signal demodulated with the carrier signal does not include the object-specific signal, and a malfunction being determined if the input signal demodulated with the further modulated carrier signal does not include the auxiliary signal.

* * * * *